US008337080B2

(12) United States Patent
Sasaoka et al.

(10) Patent No.: US 8,337,080 B2
(45) Date of Patent: Dec. 25, 2012

(54) METHOD FOR MEASURING TEMPERATURE DISTRIBUTION OF OBJECT, AND SENSOR UNIT

(75) Inventors: Eisuke Sasaoka, Yokohama (JP); Osamu Ichikawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 571 days.

(21) Appl. No.: 12/522,420

(22) PCT Filed: Dec. 19, 2007

(86) PCT No.: PCT/JP2007/074446
§ 371 (c)(1),
(2), (4) Date: Jul. 8, 2009

(87) PCT Pub. No.: WO2008/084637
PCT Pub. Date: Jul. 17, 2008

(65) Prior Publication Data
US 2010/0040108 A1 Feb. 18, 2010

(30) Foreign Application Priority Data

Jan. 10, 2007 (JP) ................................ 2007-002157

(51) Int. Cl.
*G01K 1/16* (2006.01)
(52) U.S. Cl. ...................................................... 374/120
(58) Field of Classification Search ................... 374/120
See application file for complete search history.

(56) References Cited

U.S. PATENT DOCUMENTS

| 7,534,031 | B2 * | 5/2009 | Yamamoto et al. | 374/130 |
| 7,719,666 | B2 * | 5/2010 | Kishida et al. | 356/73.1 |
| 2008/0068586 | A1 * | 3/2008 | Kishida et al. | 356/32 |
| 2008/0084914 | A1 * | 4/2008 | Yamamoto et al. | 374/137 |
| 2008/0130707 | A1 * | 6/2008 | Yamamoto et al. | 374/131 |
| 2009/0079961 | A1 * | 3/2009 | Yamamoto | 356/35.5 |
| 2009/0303460 | A1 * | 12/2009 | Habel et al. | 356/32 |
| 2010/0040108 | A1 * | 2/2010 | Sasaoka et al. | 374/120 |

FOREIGN PATENT DOCUMENTS

| JP | 2-171628 | | 7/1990 |
| JP | 02171628 | A * | 7/1990 |
| JP | 3-210440 | | 9/1991 |
| JP | 2000-180265 | | 6/2000 |
| JP | 2000180265 | A * | 6/2000 |
| JP | 2007101508 | A * | 4/2007 |

OTHER PUBLICATIONS

Kazuo Hotate et al., "Enlargement of measurement range by a temporal gating scheme in BOCDA fiber-optic distributed strain sensing system with time-division pump-probe generation scheme", The Institute of Electronics, Information and Communication Engineers, Technical Report of IEICE, OPE2004-224(Feb. 2005), pp. 37-42.

* cited by examiner

*Primary Examiner* — Lisa Caputo
*Assistant Examiner* — Jamel Williams
(74) *Attorney, Agent, or Firm* — Venable LLP; Michael A. Sartori; Tamatane J. Aga

(57) ABSTRACT

The present invention relates to a measuring method and a sensor unit of measuring temperature distribution of an object by using an optical fiber sensing technology of BOCDA system. In the measuring method, an optical fiber that functions as a BOCDA-type optical fiber sensor is disposed two-dimensionally or three-dimensionally with respect to a predetermined measurement region of the object, and thereby the temperature distribution of the object can be measured at a high speed and a high accuracy, in the predetermined measurement region configuring a surface or space where the optical fiber is disposed.

5 Claims, 8 Drawing Sheets

(a)

(b)

(a)

(b)

(a)

(b)

(c)

(a)

(b)

METHOD FOR MEASURING TEMPERATURE DISTRIBUTION OF OBJECT, AND SENSOR UNIT

TECHNICAL FIELD

The present invention relates to an object temperature distribution measuring method by using a BOCDA-type optical fiber sensor and a sensor unit applicable to the optical fiber sensor.

BACKGROUND ART

Conventionally, as an optical fiber sensor applied to a light sensing technology, an OTDR (Optical Time Domain Reflectrometer)-based optical fiber sensor which measures the physical quantity (such as temperature and loss) and a defect position in an optical fiber, by measuring a backscattering light of Rayleigh scattering which is generated when a light pulse is inputted into the optical fiber, has been known.

On the other hand, the shape of Brillouin gain spectrum (BGS) of Brillouin scattering light output from an optical fiber changes due to temperature and/or strain of the optical fiber. As a technology to measure the physical quantity of an object (to be measured) by the use of this change, a BOCDA (Brillouin Optical Correlation Domain Analysis)-type optical fiber sensor described, for example, in patent document 1 and non-patent document 1 has been known.

The technology disclosed in the above-described patent document 1 and non-patent document 1, while modulating the frequencies of pumping light and probe light, inputting these pumping light and probe light oppositely from both ends of an optical fiber, and thereby causing Brillouin scattering to occur at a desired position in the longitudinal direction of the optical fiber. The temperature distribution along the longitudinal direction of the optical fiber is measured by measuring a gain spectrum resulting from this Brillouin scattering.

In accordance with this kind of optical fiber sensor with a fiber-optic distributed strain sensing technology (BOCDA-type) adopting Brillouin scattering method, by a continuous lightwave correlation control method, in comparison with the optical fiber sensing with Raman scattering method or the like that has been conventionally known, the superior effects in various characteristics such as a measurement temperature range, the spatial resolution of the temperature distribution measurement in the longitudinal direction, measuring time, and the like can be expected.

For example, a BOCDA-type optical fiber sensor can maintain a sufficient level of the intensity (gain) of Stokes light even at a very low temperature. Furthermore, because a BOCDA-type optical fiber sensor measures temperature by frequency shift, it has been confirmed that the optical fiber sensor is higher in noise tolerance than that in optical fiber sensing with Raman scattering method in which temperature is measured based on the light intensity ratio, and can measure down to the absolute temperature 1K.

Also, as described below, about the spatial resolution of a BOCDA-type optical fiber sensor, a typical optical fiber can realize a sampling interval of approximately 1 cm in the longitudinal direction. Furthermore, because continuous light is used in a BOCDA-type optical fiber sensor, it has been confirmed that it is possible to measure at a high speed, and it is possible to measure at 57 Hz per measurement point.

Furthermore, a BOCDA-type optical fiber sensor can adjust freely the spatial resolution, measuring range, and measuring time of the temperature distribution measurement along the longitudinal direction of an optical fiber, in accordance with the characteristics of an object to be measured and the like, by adjusting the frequency-modulation pattern of pumping light and probe light. Also, a BOCDA-type optical fiber sensor can adjust freely sampling intervals in addition to spatial resolution.

Patent document 1: Japanese Patent Laid-Open Publication No. 2000-180265
Non-patent document 1: Kazuo Hotate, and Hiroshi Arai, "Enlargement of Measurement Range by a Temporal Gating Scheme in BOCDA Fiber-Optic Distributed Strain Sensing System with Time-Division Pump-Probe Generation Scheme", IEICE Technical Report, The Institute of Electronics, Information and Communication Engineers, OPE2004-224 (2005-02)

DISCLOSURE OF THE INVENTION

Problems that the Invention is to Solve

The inventors have studied the conventional optical fiber sensor in detail, and as a result, have found problems as follows.

Namely, it has been difficult to achieve the satisfactory measuring performance, about the spatial resolution and measuring time in object temperature distribution measurement, with a conventional OTDR-type optical fiber sensor. Also, although an established means such as infrared thermography has been known, the thermography has been limited to the temperature measurement of a surface of an object and has been unsuitable for the temperature distribution measurement on the back side of and in the depth direction of the object.

Namely, a conventional measuring method of OTDR system has not been suitable for the three-dimensional temperature distribution measurement of a structure, the three-dimensional temperature distribution measurement of the contents (liquid, gas, and the like) in a tank, the fine, two-dimensional temperature distribution measurement in the order of cm or mm, or the like.

The present invention is made to solve the aforementioned problem, and it is an object to provide a measuring method and a sensor unit for measuring at a higher speed and a higher accuracy the temperature distribution in the predetermined measurement region (measurement surface or measurement space) of an object, without limiting the shape of the object, by using an optical fiber sensing technology of BOCDA system that has excellent characteristics.

Means for Solving the Problems

In order to achieve the above-described objective, an object temperature distribution measuring method according to the present invention measures the temperature distribution in a predetermined measurement region of an object by using a BOCDA-type optical fiber sensor. Here, "predetermined measurement region" is a concept that includes also a three-dimensional space such as the interior space and surface of an object in addition to the shape of a plane on which an object itself can be placed. A predetermined measurement region with a plane shape includes, for example, a flat surface, elevation surface, curved surface, and the like with a predetermined size or shape, and hereinafter, in this description, the predetermined measurement region with a plane shape indicates simply "measurement surface". Also, a predetermined measurement region of a three-dimensional space includes, for example, the interior space, container surface, and the like of a container with a predetermined size or shape, and hereinafter, the predetermined measurement region of a three-dimensional space indicates simply "measurement space".

In the case where the predetermined measurement region has a plane shape such that an object can be placed thereon, in the measuring method, an optical fiber, which includes a sensor portion that comes close to or comes in contact with the object and that is disposed two-dimensionally on the measurement surface of the object while suppressing the fluctuation of the relative position of each part thereof, is prepared.

On the other hand, in the case where the predetermined measurement region is a three-dimensional space, in the measuring method, an optical fiber, which includes a sensor portion that comes close to or comes in contact with an object and that is disposed three-dimensionally inside the measurement space of the object while suppressing the fluctuation of the relative position of each part thereof, is prepared.

Even when the predetermined measurement region is either of plane shape and space, the measuring method inputs probe light and pumping light oppositely, measures Brillouin gain spectrum (BGS), and determines the temperature distribution in the predetermined measurement region (measurement surface or measurement space). In other words, pumping light is inputted from one end of a prepared optical fiber, while probe light is inputted from the other end of the optical fiber. In this manner, the frequencies of the pumping light and probe light inputted oppositely from both ends of the optical fiber are modulated, and thereby BGS induced at a desired position in the longitudinal direction of the optical fiber is measured. Then, as the temperature distribution in the predetermined measurement region of the object, the temperature distribution of a sensor portion disposed two-dimensionally or three-dimensionally (at least a portion positioned in the predetermined measurement region of the object) is determined along the longitudinal direction of the optical fiber.

Incidentally, in the present invention, the sampling interval and spatial resolution of the temperature distribution measurement along the longitudinal direction of an optical fiber, the range of the temperature distribution measurement, and the execution time of the temperature distribution measurement are preferably set by adjusting the frequency-modulation pattern of the pumping light and probe light according to the kind of a fluid as an object to be measured.

A sensor unit according to the present invention is applied to a BOCDA-type optical fiber sensor which measures the physical quantity in the predetermined measurement region of an object. In particular, the sensor unit comprises an optical fiber that is disposed two-dimensionally or three-dimensionally in accordance with the shape of the predetermined measurement region of an object, and a fixing structure that holds the relative position of each part in the optical fiber.

In concrete terms, the optical fiber includes a sensor portion that comes close to or comes in contact with an object, and the sensor portion is placed two-dimensionally or three-dimensionally with respect to the predetermined measurement region (measurement surface or measurement space) of the object. The fixing structure holds the arrangement state of the sensor portion so as to suppress the fluctuation of the relative position of each part in the sensor portion of the optical fiber.

Incidentally, each of the above-described measurement surface and measurement space can be selected optionally in accordance with the size, shape, and characteristic of an object.

Also, a sensor unit is constituted by a sensor portion of an optical fiber, and a base (including a fixing structure) integrated with the sensor portion. The base of the sensor unit is a structure that decides an arrangement configuration of an optical fiber being a sensor portion; may be, for example, a sheet, three-dimensional material body (cylindrical body, wire-worked-body, or the like), or the like; and is a material body that can be handled as a sensor unit. In the case where the base of the sensor unit is a sheet, a sensor portion of the optical fiber is arranged in a planar manner on the surface of the base. A temperature distribution measurement on a measurement surface is performed in the state where this base is arranged so as to come in contact with the surface of an object. At this time, a sheet may be covered on a surface on which a sensor portion of an optical fiber is arranged. In the case where the base of the sensor unit is a wire-worked-body, for example, at least the sensor portion of the optical fiber is embedded inside a coating layer of the wire-worked-body, or is further covered at the surface thereof by a coating (tape and the like) in the state where the sensor portion is disposed along a wiring material (wire and the like).

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effects of the Invention

As described above, the present invention can make full use of the optical fiber characteristics such as, in addition to having lightness, smallness of diameter, and explosion prevention, not having the effects from electromagnetic noise and the like, not causing them, and the like. In particular, for use of an optical fiber sensing technology of BOCDA system which can measure the temperature distribution along the longitudinal direction of an optical fiber, with Brillouin scattering, at a high accuracy and in a short time, the sensor portion of the optical fiber is disposed two-dimensionally or three-dimensionally with respect to the predetermined measurement region (measurement surface or measurement space) of an object. Therefore, the temperature distribution measurement at a high accuracy which has been difficult with the conventional sensing technology can be performed, according to the shape and characteristics of an object.

In particular, when a sensor portion of an optical fiber is disposed three-dimensionally with respect to a measurement space, not only on the surface of an object but also in the length direction, height direction, and back side of the object, the three-dimensional temperature distribution can be measured at a high accuracy and in a short time. Thus, the present invention is extremely effective in the temperature distribution measurement of a three-dimensional, complicated structure and the liquid, gas, or the like contained in a container, and exerts many effects.

DESCRIPTION OF THE REFERENCE NUMERALS

1: temperature measuring optical fiber; 2: measurement surface; 2': measurement space; 3a, 3b: connection optical fiber; and 4: BOCDA-type temperature sensor body.

BEST MODES FOR CARRYING OUT THE INVENTION

In the following, embodiments of an object temperature distribution measurement method and a sensor unit according to the present invention will be explained in detail with reference to FIGS. 1 to 8. In the explanation of the drawings, constituents identical to each other will be referred to with numerals identical to each other without repeating their overlapping descriptions.

Figure 1:
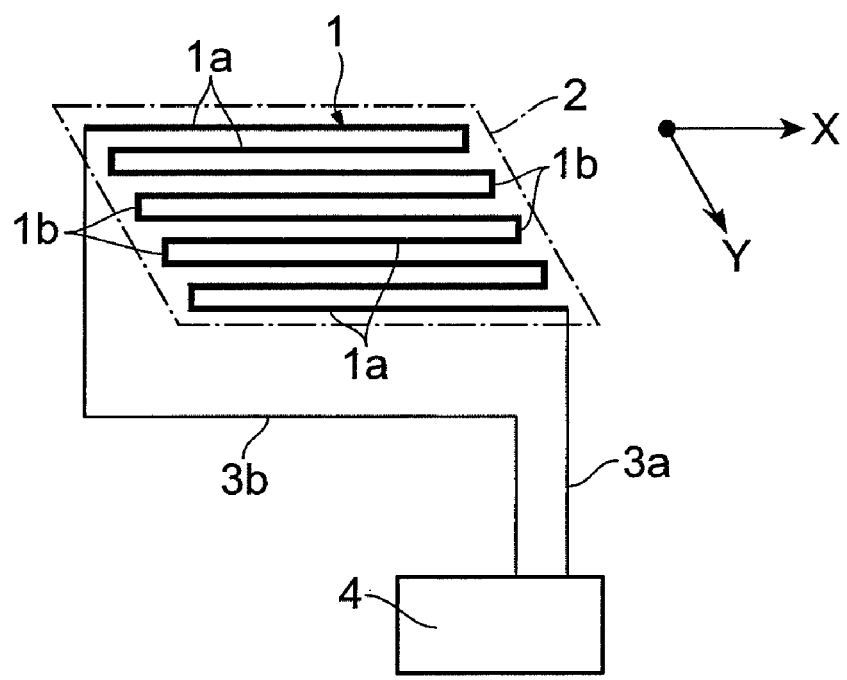
FIG. 1 is a perspective view showing a schematic structure of a BOCDA-type optical fiber sensor which realizes an object temperature distribution measurement method according to the present invention.

FIG. 1 is a perspective view showing a schematic structure of a BOCDA-type optical fiber sensor which realizes an object temperature distribution measurement method according to the present invention. As shown in FIG. 1, the BOCDA-type optical fiber sensor comprises a temperature measuring optical fiber 1 (sensor portion) and a temperature sensor body 4, and in addition the optical fiber 1 and the temperature sensor body 4 are coupled optically to each other, via connecting optical fibers 3a and 3b. The optical fiber 1 is disposed two-dimensionally on a measurement surface 2 of an object which is comparted in quadrilateral shape. In particular, a long side part 1a of the optical fiber 1 which extends in the direction X on the quadrilateral-shaped measurement surface 2 is arranged in parallel per appropriate interval, and a short side part 1b that extends in the direction Y on the measurement surface 2 is arranged approximately in zigzags two-dimensionally to connect the end parts of the adjacent long side parts 1a.

The connecting optical fibers 3a and 3b for optically coupling the optical fiber 1 to the temperature sensor body 4, is connected to both ends of the optical fiber 1. These optical fibers 3a and 3b are positioned outside the measurement surface 2, and by coupling them to the temperature sensor body 4 the optical fiber 1 functions as a sensor part of BOCDA system (a fiber-optic distribution sensing technology adopting Brillouin scattering method, by a continuous light wave correlation control method).

Figure 2:
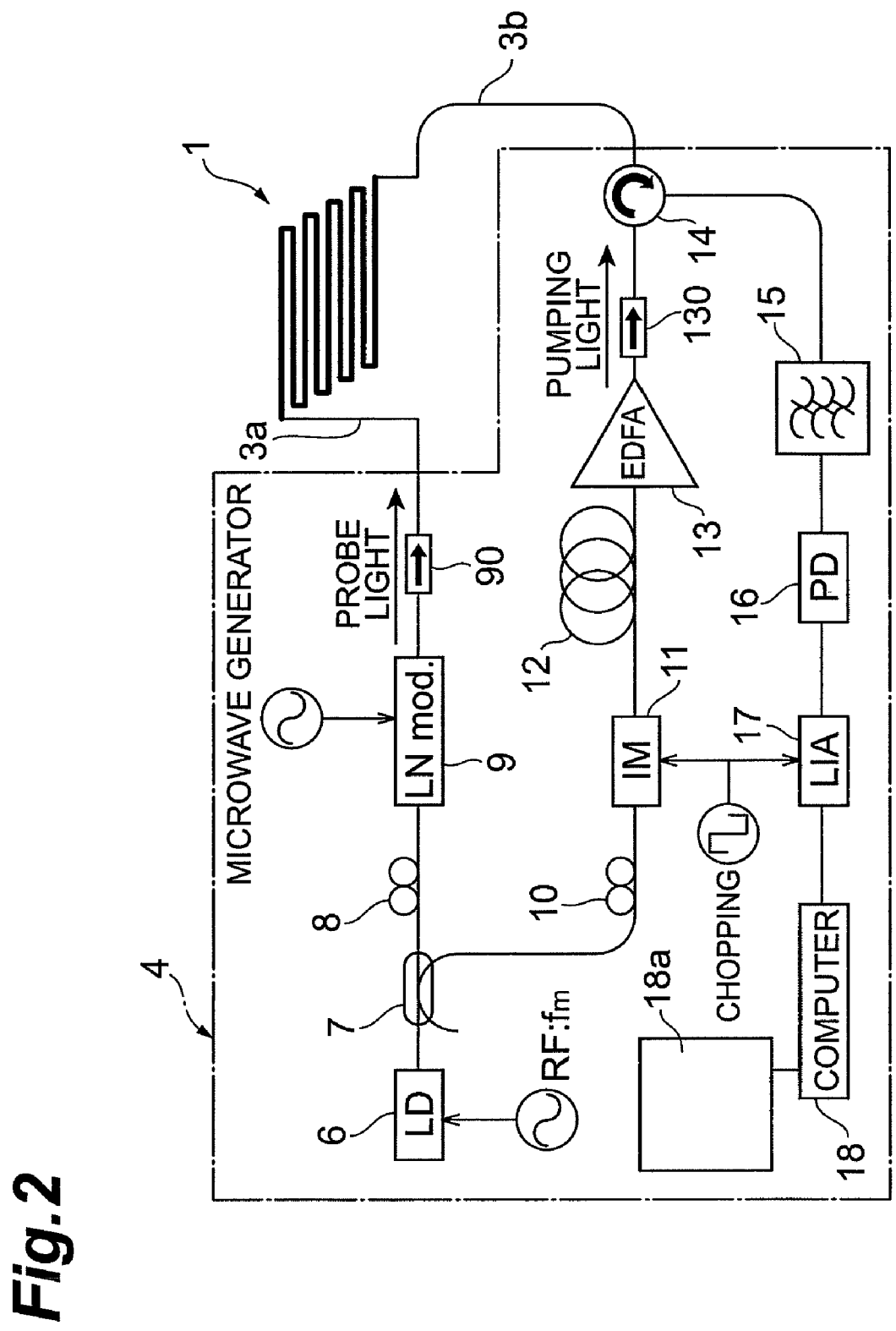
FIG. 2 is a view showing a specific configuration example of a BOCDA-type optical fiber sensor which realizes an object temperature distribution measurement according to the present invention.

The temperature sensor body 4 of the BOCDA-type optical fiber sensor is configured as shown in FIG. 2. Namely, the temperature sensor body 4 has a laser diode (LD) 6 as a light source and in addition comprises a probe light generating system, a pumping light generating system, and a measuring system. The probe light generating system comprises a 3 dB-coupler 7, a polarization controller 8, a phase modulator (LN mod.) 9 that is controlled by a microwave generator, and an isolator 90. The pumping light generating system comprises the 3 dB-coupler 7, a polarization controller 10, an intensity modulator (IM) 11, a delay line 12, an optical fiber amplifier (EDFA) 13, an isolator 130, and a circulator 14. The measuring system comprises the circulator 14, an optical filter 15, a photodiode 16, a lock-in amplifier (LIA) 17, a control unit (computer) 18, and a display 18a.

First, the light output from the LD 6 is divided into two lightwave components at the 3 dB-coupler 7. The one light is transmitted through the polarization controller (PC) 8 and shifted in frequency by approximately 11 GHz at the phase modulator (LN mod.) 9. This frequency-shifted light passes through the isolator 90 and the connecting optical fiber 3a in this order as probe light, and enters one end of the optical fiber 1 (sensor portion). The other light is transmitted through the polarization controller 10, the intensity modulator (IM) 11 and the delay line 12, and amplified in the optical fiber amplifier (EDFA) 13. This amplified light passes through the isolator 130 and the connecting optical fiber 3b in this order as pumping light, and enters the other end of the optical fiber 1. In this manner, the pumping light and probe light propagate oppositely through the optical fiber 1, and stimulated Brillouin scattering (SBS) is generated. At this time, the probe light is amplified by only the gain corresponding to a gain spectrum (BGS) of Stokes light. The amplified probe light is guided through the circulator 14 into the optical filter 15. After the unnecessary light component is eliminated by the optical filter 15, BGS is detected from the probe light by the photodiode (PD) 16, the lock-in amplifier (LIA) 17, and the like. The control unit 18 (computer) measures the temperature distribution of an object, and in addition displays the distribution state in the display 18a, based on this BGS detection result.

In the above-described BOCDA-type optical fiber sensor, the frequencies of pumping light and probe light are modulated by changing an injection current to the LD 6, into sinusoidal-wave-shaped one. On this account, in the longitudinal direction of the optical fiber 1, a high-correlation position (correlation peak) and low-correlation position where the frequency difference between the pumping light and probe light is constant are generated, and large SBS is generated only in the correlation peak.

As a result of this, BGS information of Stokes light at a specific position can be obtained, and by changing in sequence the frequency modulation pattern of pumping light and probe light it is possible to measure at a high accuracy and in a short time the temperature distribution of an object that is mounted on the optical fiber 1 arranged two-dimensionally, or is in proximity above or below the optical fiber 1.

Incidentally, as an object for a temperature distribution measurement, a material body that can be mounted on the optical fiber 1 (sensor portion) arranged two-dimensionally, a material body and a fluid that can be brought close to or be brought into contact with above or below the optical fiber 1, and the like, as described above are included.

Figure 3:
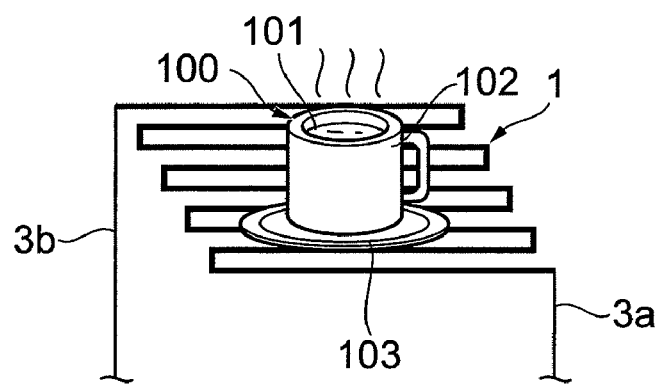
FIG. 3 is a view for schematically explaining the temperature distribution measurement of an object.
Figure 3:
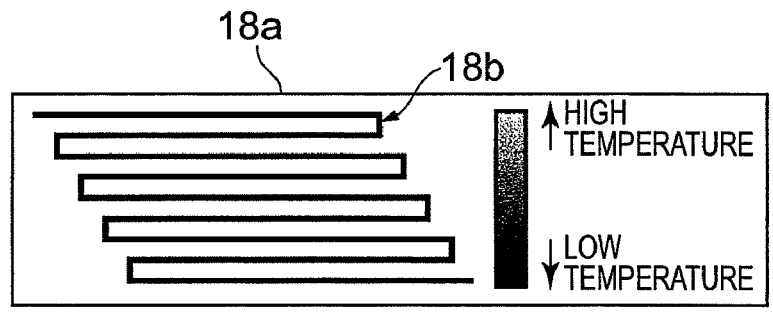

FIG. 3 is a view for schematically explaining a temperature distribution measurement of an object. Also, in FIG. 3, the area (a) is a perspective view showing the used state of the optical fiber sensor as shown in FIG. 1, and the area (b) is a view showing a display example in the display 18a that displays the measurement result of a use example shown in the area (a).

For example, as shown in the area (a) of FIG. 3, when a cup 102 that contains a hot liquid 101 such as coffee and a saucer 103 as an object 100 are placed on the optical fiber 1 (sensor portion) arranged two-dimensionally, the temperature distribution of the saucer 103 that is directly in contact with the optical fiber 1 can be measured.

The object temperature distribution data acquired under such a situation is transmitted to a measurement display means (including the control unit 18 and the display 18a) configured by a personal computer and the like, which is incorporated in the temperature sensor body 4 (see FIG. 2).

The measurement display means includes the display 18a that can display the measurement result by the optical fiber 1, in the form similar to the two-dimensional arrangement of the optical fiber 1, and can visually display the measurement result.

For example, the result of the temperature distribution measurement of the object 100 in the area (a) of FIG. 3 is displayed in the display 18a by a display pattern 18b similar to the two-dimensional arrangement of the optical fiber 1 as shown in the area (b) of FIG. 3. At this time, the temperature distribution displayed in the display 18a can be discriminated by color coding such as using the deep color on the low temperature side, the pale color on the high temperature side, and the like as shown in the area (b) of FIG. 3.

Incidentally, a BOCDA-type optical fiber sensor can adjust freely the sampling interval, measuring range, measuring time, and the like, along the longitudinal direction of the optical fiber 1, by adjusting the frequency-modulation pattern of pumping light and probe light. Namely, it is important that fineness and spread regarding position of the temperature distribution variation of an object, and the speed of the temperature change, correspond to the sampling interval, measuring range, and measuring time along the longitudinal direction of the optical fiber 1 with an optical fiber sensor, in order to accurately obtain the temporal change data and two-dimensional distribution data of the temperature distribution. Incidentally, it is impossible to perform a meaningful measurement even when a sampling interval is set shorter than the spatial resolution of an optical fiber sensor.

For example, when the temperature distribution in the measurement surface 2 with an area of 30 cm² is measured, it is preferred that the measuring range of the optical fiber 1 is as close as possible to 30 cm², that is, the number of sampling intervals (dz) in the longitudinal direction of the optical fiber 1 is as large as possible. Also, measuring time at each measurement point is preferably as short as possible. In this manner, in a temperature distribution measurement, a measuring range of approximately 30 cm², the spatial resolution of 1 cm, and the measuring time of 0.1 s or less are a sufficiently feasible requirement level by an optical sensing technology of BOCDA system.

The spatial resolution $\Delta z_r$ of an optical sensor of BOCDA system is expressed by the following expression (1)

$$\Delta Z_r = \frac{\Delta v_B}{f_m} \frac{v_g}{2\pi m f_m} \quad (1)$$

where $mf_m$ and $f_m$ respectively are an amplitude and modulation-frequency of the sinusoidal-wave-shaped frequency-modulation that is applied to a light source, $\Delta v_B$ is a BGS line width, and $v_g$ is a group velocity of light.

To give one example, about a typical optical fiber with a group velocity of $2.0 \times 10^8$ m/s and a BGS line width of 50 MHz, when using a frequency-modulation amplitude 2 GHz and modulation-frequency 100 MHz which can be realized by an existing laser diode (LD), the spatial resolution along the longitudinal direction of the optical fiber becomes approximately 1 cm.

Also, because continuous light is used in a BOCDA-type optical fiber sensor, OSNR (optical signal-to-noise intensity ratio) is good in comparison with a pulse method, and furthermore, there is no need for integrating and averaging an optical signal. Thus, it has been confirmed that it is possible to perform at a high speed a temperature distribution measurement, and it is possible to measure at 57 Hz per measurement point. The application of the present invention can preferably include, for example, the case of measuring the temperature distribution of a measured object with a complicated shape, and the like.

Figure 4:
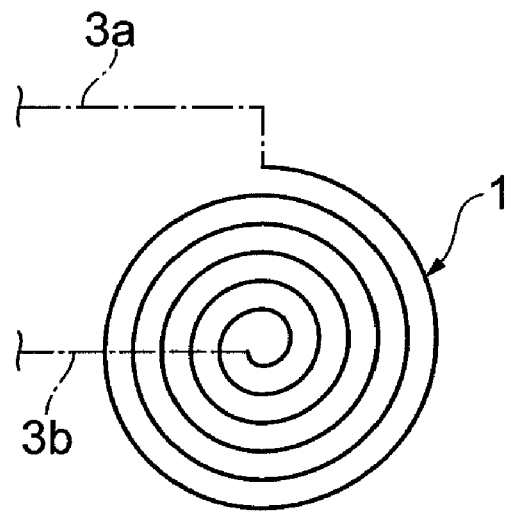
FIG. 4 is a view showing an example of two-dimensional arrangement of a BOCDA-type optical fiber sensor which realizes an object temperature distribution measurement according to the present invention, and particularly a sensor portion of an optical fiber included in a sensor unit.
Figure 4:
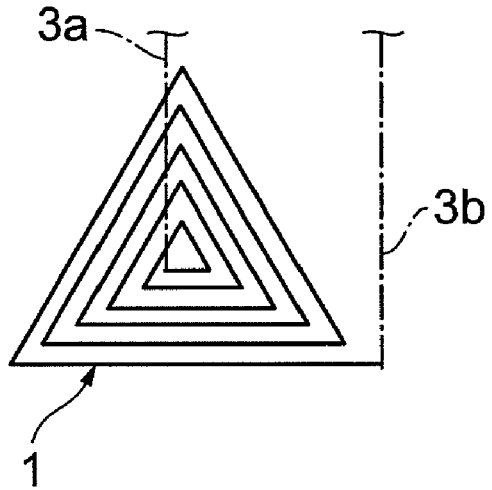

FIG. 4 is a view showing an example of two-dimensional arrangement of, a BOCDA-type optical fiber sensor which realizes an object temperature distribution measurement according to the present invention, and particularly a sensor portion of the optical fiber 1 included in a sensor unit.

In an arrangement example as shown in the area (a) of this FIG. 4, the optical fiber 1 is arranged two-dimensionally in the circular, spiral shape in a circular measurement surface. On the other hand, in an arrangement example as shown in the area (b), the optical fiber 1 is arranged two-dimensionally in the triangular, spiral shape in a triangular measured-surface. Also, even in either of the arrangement examples, the one ends of the connecting optical fibers 3a and 3b respectively are connected to both ends of the optical fiber 1, and the optical fiber 1 functions as the BOCDA-type optical fiber sensor, by coupling the other ends of these connecting optical fibers 3a and 3b to the temperature sensor body 4 (FIG. 2).

Figure 5:
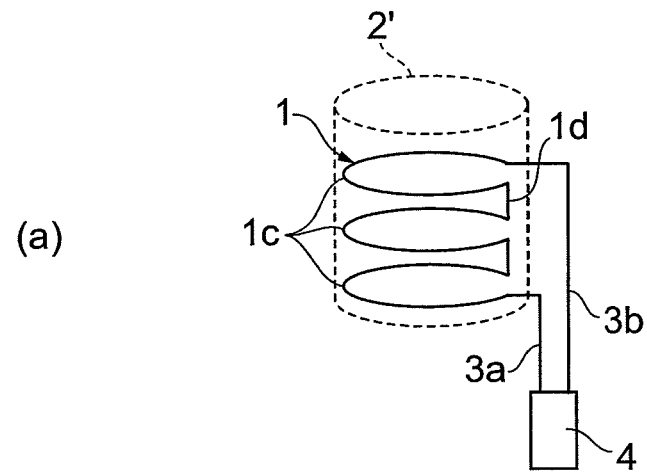
FIG. 5 is a view showing an example of three-dimensional arrangement of a BOCDA-type optical fiber sensor which realizes an object temperature distribution measurement according to the present invention, and particularly a sensor portion of an optical fiber included in a sensor unit.
Figure 5:
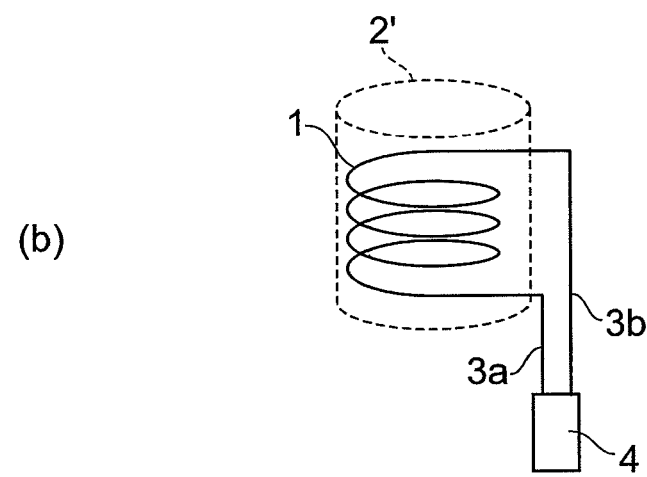
Figure 5:
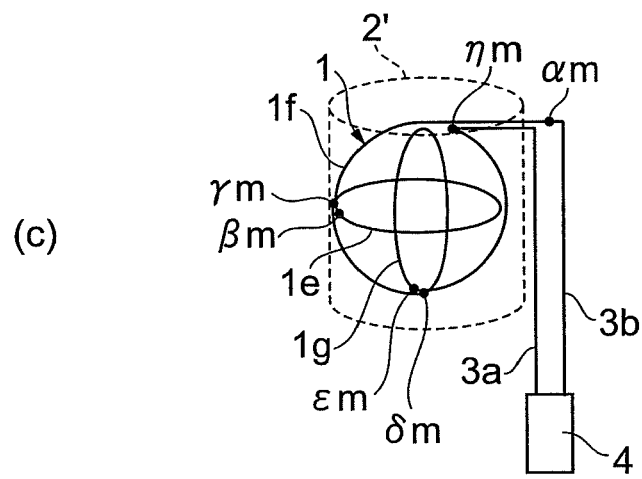

Incidentally, the two-dimensional arrangement configuration of the optical fiber 1 is not limited to the examples as shown in FIG. 4, and various two-dimensional arrangement configurations can be adopted, according to the shape and characteristic of an object FIG. 5 is a view showing an example of three-dimensional arrangement of, a BOCDA-type optical fiber sensor which realizes an object temperature distribution measurement according to the present invention, and particularly a sensor portion of an optical fiber included in a sensor unit.

In an arrangement example as shown in the area (a) of this FIG. 5, the optical fiber 1 is arranged in the measurement space 2' that is comparted in cylindrical shape, a circular part 1c is arranged in multistage in the height direction of the container, and in addition these circular parts 1c are joined with a vertical part 1d. By thus partially deforming, the one ends of the connecting optical fibers 3a and 3b respectively are connected to both ends of the optical fiber 1 that is arranged three-dimensionally. These connecting optical fibers 3a and 3b are positioned outside the measurement space 2', and by connecting the other end of each of them to the temperature sensor body 4, the optical fiber 1 functions as a BOCDA-type optical fiber sensor.

Incidentally, the areas (b) and (c) of FIG. 5 show the deformation examples of a three-dimensional arrangement configuration of the optical fiber 1.

Namely, in an arrangement example as shown in the area (b) of FIG. 5, the optical fiber 1 is disposed in spiral shape along the height direction of the measurement space 2'. At this time, the one ends of the connecting optical fibers 3a and 3b positioned outside the measurement space 2' are coupled to both ends of the optical fiber 1.

On the other hand, in the arrangement example shown in the area (c) of FIG. 5, the optical fiber 1 is arranged so as to have a latitude line shaped part 1e arranged in a center part of a virtual spherical body, and two orthogonal longitude line shaped parts 1f and 1g that are arranged to pass through the top and bottom points of the virtual spherical body inside the measurement space 2'. At this time, the one ends of the connecting optical fibers 3a and 3b positioned outside the measured space 2' are coupled to both ends of the optical fiber 1.

Incidentally, the three-dimensional arrangement configuration of the optical fiber 1 is not limited to the examples as shown in FIG. 5, and various three-dimensional arrangement configurations can be adopted, according to the shape and characteristic of an object.

As described above, when being arranged three-dimensionally by partially deforming the optical fiber 1, not only the surface temperature distribution (two-dimensional temperature distribution) of an object but also the temperature distribution in three-dimension that includes the height direction, length direction, depth direction, and the like of the object, can be measured.

The application in which such a three-dimensional arrangement of the optical fiber 1 is applied includes, for example, the case of desiring to hold the temperature of a liquid or gas contained in a container as an entity that configures the measured space 2', constant throughout the container interior, and to cause the temperature difference with a desired pattern, and the like. The present invention is preferably used for, for example, the case sensitive to the environmental temperature, such as causing the crystal growth, and the desired chemical reaction and fermentation in a container, and the like; the process that for itself causes a change in temperature; and the like.

Next, a structural example as a sensor unit that integrates the optical fiber 1 shown in FIG. 1 with a sheet-shaped base will be described in detail, with reference to FIGS. 6 to 8. Incidentally, in FIG. 6, the area (a) is a plan view of a sensor unit 200a according to a first embodiment, and the area (b) is a side view of the sensor unit 200a. In FIG. 7, the area (a) is a plan view showing another connecting sensor unit 200a' arranged adjacent to the sensor unit 200a according to the first embodiment, and the area (b) is a plan view showing a state in which two kinds of sensor units 200a and 200a' are arranged adjacently (a sensor unit according to a second embodiment). Also, in FIG. 8, the area (a) is a plan view of a sensor unit 200b according to a third embodiment, and the areas (b) and (c) are side views of the sensor unit 200b in the case where the sensor unit 200b is seen respectively in the different direction.

Figure 6:
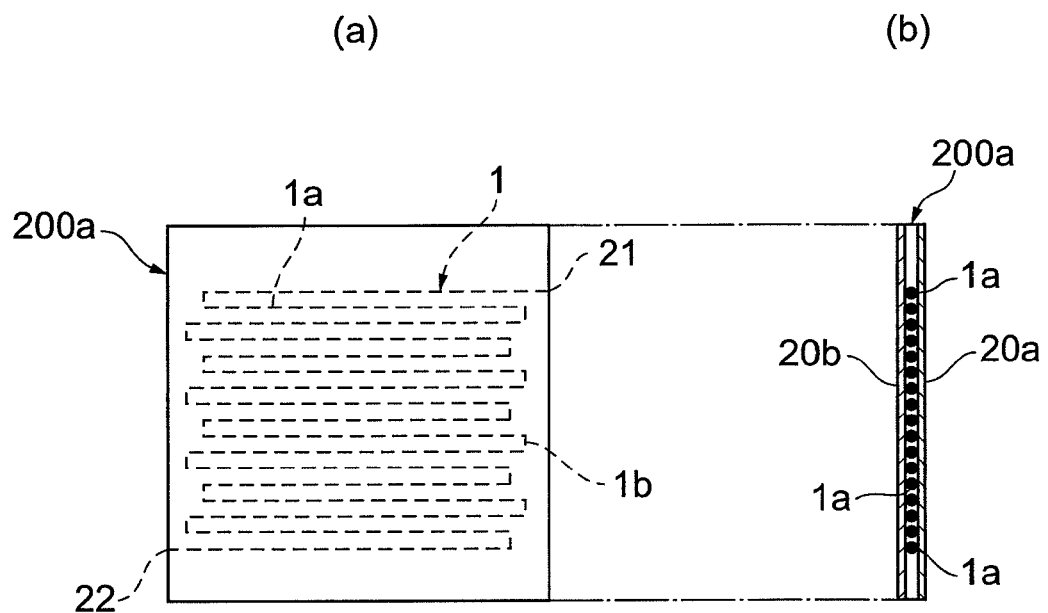
FIG. 6 is a view for showing a configuration of a first embodiment of the sensor unit according to the present invention.
Figure 7:
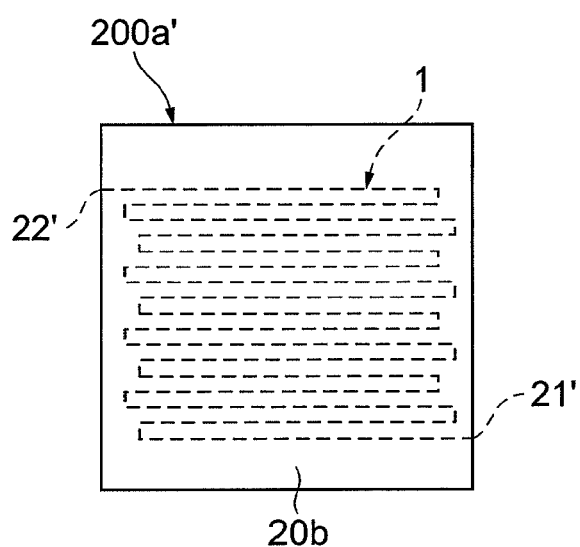
FIG. 7 is a view for showing a configuration of a second embodiment of the sensor unit according to the present invention.
Figure 7:
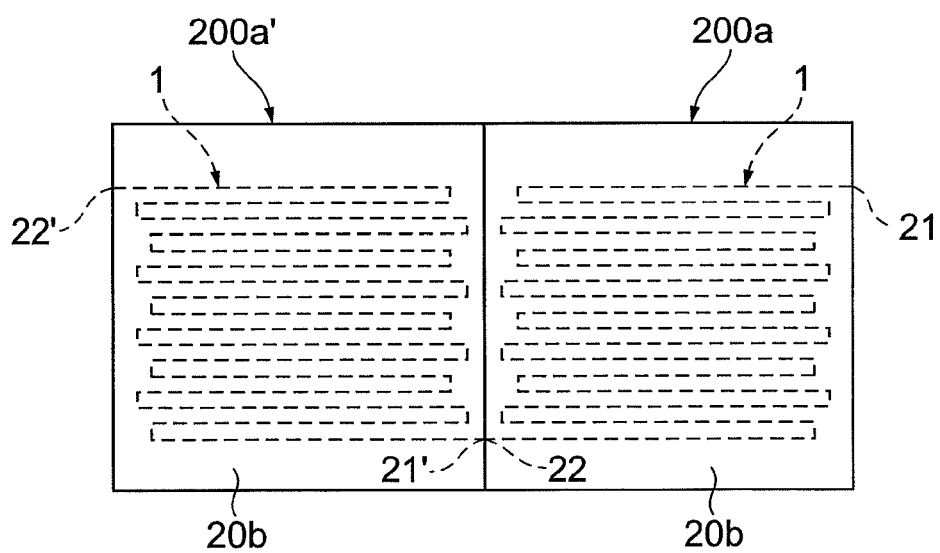

The sensor unit according to the first embodiment as shown in FIG. 6 includes the optical fiber 1 (sensor portion) for temperature measurement and a sheet-shaped base. The optical fiber 1 is arranged two-dimensionally in a manner similar to the arrangement example shown in FIG. 1, on the top surface of a sheet 20a in quadrilateral shape. A protecting sheet 20b on the top surface of this optical fiber 1 is layered, and thereby the optical fiber 1 is integrated with the sheet-shaped base.

The first optical fiber 1 has connecting end parts 21 and 22, and the temperature sensor body 4 (see FIG. 2) and the first optical fiber 1 are coupled optically to each other, via the connecting optical fibers 3a and 3b whose one ends are connected to these end parts 21 and 22. By this configuration, the optical fiber 1 functions as a BOCDA-type optical fiber sensor.

In the sensor unit 200a according to the above-described first embodiment, by the optical fiber 1 arranged two-dimensionally on or inside the base, the broader application as sensor unit can be expected by attaching it to the appropriate place of an object for use and the like, in addition to the effect of the configuration as shown in FIG. 1.

Also, this kind of sensor unit 200a according to the first embodiment may be connected to the connecting sensor unit 200a' as shown in the area (a) of FIG. 7. This connecting sensor unit 200a' is a sensor unit in which a sheet-shaped base having the connecting end parts 21' and 22' at the places corresponding to the connecting end parts 21 and 22, and the optical fiber 1 are integrated. These bases of the sensor unit 200a and of the connecting sensor unit 200a' may be coupled adjacently to each other as shown in the area (b) of FIG. 7, for example (the sensor unit according to the second embodiment). In this case, each optical fiber 1 of the adjacent sensor units 200a and 200a' is fusion-spliced to each other (may be connected by a connector). In this manner, in the sensor unit according to the second embodiment, the optical fiber 1 is arranged two-dimensionally on or inside the base, in addition a plurality of sheet-shaped bases in which a connecting end part is formed at the appropriate place is connected, and thereby a sensor unit with a two-dimensional arrangement configuration suitable for the size and shape of the predetermined measurement region of an object is obtained.

Figure 8:
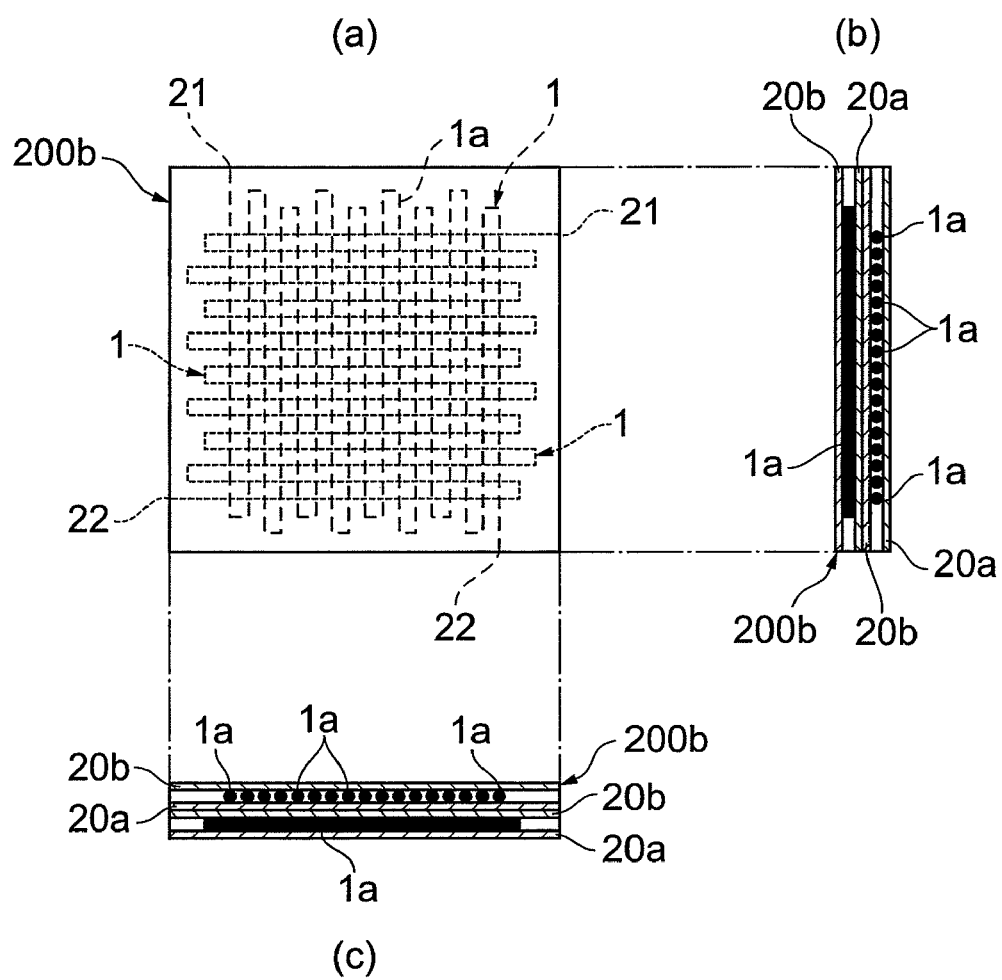
FIG. 8 is a view for showing a configuration of a third embodiment of the sensor unit according to the present invention.

Furthermore, in the sensor unit 200b according to the third embodiment as shown in FIG. 8, the sheet-shaped bases in which the optical fiber 1 is contained are superposed in multistage, and in addition the optical fiber 1 is arranged three-dimensionally so that the orientation thereof inside the upper and lower bases may be orthogonal to each other.

In this sensor unit 200b according to the third embodiment, more measurement points can be set by the upper and lower optical fibers 1. Therefore, in the sensor unit 200b according to the third embodiment, wherein the optical fiber 1 is arranged three-dimensionally, the temperature distribution measurement at a higher accuracy can be performed.

As described above, to unitize the optical fiber 1 by a sheet, three-dimensional material body (cylindrical body, wire-worked-body, or the like), or the like can be realized similarly even in the arrangement example as shown in FIGS. 4 and 5. In that case, a base having the optical fiber 1 arranged two-dimensionally or three-dimensionally is formed in a predetermined planar shape or three-dimensional shape. Also, a connecting part is formed at the appropriate place inside the base.

Now, in the present invention, when a two-dimensional or three-dimensional temperature distribution is determined by using an optical fiber as sensor portion, it is important that the relationship between the position in the longitudinal direction of an optical fiber by which temperature is measured and the measurement place of an object is accurately grasped.

As an example, in each embodiment as described above, an embodiment is assumed in which scale marks are drawn along the longitudinal direction of the optical fiber 1, on the cover of the temperature measuring optical fiber 1, or the exterior covering of a cord, cable, or the like which contains it. In this case, as the origin position (reference position) of the scale marks in the longitudinal direction, a connecting point connecting an optical fiber (for example, the connecting optical fiber 3a, 3b, or the like) different from the optical fiber 1 that measures temperature, or a position different, in temperature or strain of the optical fiber 1, from the other portions or the like, that is, a position that is significantly different, in BGS from the other portions is set as the origin position. Thus, the positional relationship between an object and the temperature measuring optical fiber 1 is grasped via scale marks along the longitudinal direction of the optical fiber 1, and the optical fiber 1 and the temperature sensor body 4 are related to each other via the significantly different origin position in BGS.

By the above-described configuration, the temperature distribution of an object can be reconstructed accurately by the measurement result of the temperature sensor body 4.

Incidentally, in the above-described embodiment, although scale marks are drawn on the optical fiber 1 on the assumption of visual observation, if the positional relationship between the temperature measuring optical fiber 1 and an object can be accurately grasped, it is not limited to the scale marks drawn on the optical fiber 1. For example, the method in which a marker that generates at a constant interval various signals such as an electrical signal, magnetic signal, optical signal, acoustical signal, and the like is attached to the temperature measuring optical fiber 1, or the like also can be adopted.

Furthermore, although the optical fiber 1 arranged three-dimensionally in the shape of a virtual spherical body which has the latitude line shaped part 1e and the longitude line shaped parts 1f and 1g is shown in the area (c) of FIG. 5, as an application of the arrangement example shown in the area (c), it is assumed to compare the virtual spherical body to the earth as well. For example, when the position corresponding to the north pole is associated with the position at a m from the origin position, the position on the equator which is reached from the north pole through a portion of the longitude line shaped part 1f is associated with the position at β m from the origin position, the latitude line shaped part 1e is arranged so as to make a round on the equator from here, the position back after making a round is associated with the position at γ m from the origin position, the south pole which is reached from here through a portion of the longitude line shaped part 1f is associated with the position at δ m from the origin position, the latitude line shaped part 1g is arranged from here, the south pole back after making a round is associated with the position at ε from the origin position, and the position further back from here to the north pole is associated with the position at η m from the origin position, the temperature distribution from one-dimensionally to three-dimensionally can be reconstructed.

Incidentally, on the route where the optical fiber 1 is arranged, when it is anticipated that the deviation from the measurement assumption point is out of the tolerable range, about a position to be associated with, the position may not be associated with for the first time on the equator next to the north pole, but may be associated with per 10 degree against the latitude, for example.

Although the above-described association on the global scale is performed based on an arrangement example as shown in the area (b) of FIG. 5, it is not limited to this figure, which is similar even in FIG. 3, and FIGS. 5 to 8.

As described above, in the case that the correspondence between the position in the longitudinal direction of the optical fiber 1 and each measurement point of an object is accurately grasped, the temperature distribution of an object can be reconstructed by the measurement result of the temperature sensor body 4, even in any of one-dimension to three-dimension. Also, it is possible to provide the means for such an association by devising the deformation state of the optical fiber 1.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

A measuring method and a sensor unit according to the present invention can be applied to an optical fiber sensing technology of BOCDA system which can measure at a high speed and a high accuracy the temperature distribution in the predetermined measurement region (measurement surface or measurement space) of an object, without limiting the shape of the object.

The invention claimed is:

1. An object temperature distribution measuring method of measuring temperature distribution in a predetermined measurement region of an object by using a BOCDA-type optical fiber sensor, said measuring method comprising the steps of:
   preparing an optical fiber which includes a sensor portion that comes close to or comes in contact with the object, said sensor portion being disposed two-dimensionally on the predetermined measurement region of the object while suppressing fluctuation of relative position of each part thereof;
   inputting pumping light from one end of said optical fiber, while inputting probe light from the other end of said optical fiber;
   measuring Brillouin gain spectrum induced at a desired position of said optical fiber in a longitudinal direction by modulating frequencies of the pumping light and probe light inputted oppositely from both ends of said optical fiber; and
   determining, as the temperature distribution of the predetermined measurement region of the object, the temperature distribution of said sensor portion disposed two-dimensionally along the longitudinal direction of said optical fiber.

2. An object temperature distribution measuring method of measuring temperature distribution in a predetermined measurement region of an object by using a BOCDA-type optical fiber sensor, said measuring method comprising the steps of:
   preparing an optical fiber which includes a sensor portion that comes close to or comes in contact with the object, said sensor portion being disposed three-dimensionally on the predetermined measurement region of the object while suppressing fluctuation of relative position of each part thereof;
   inputting pumping light from one end of said optical fiber, while inputting probe light from the other end of said optical fiber;
   measuring Brillouin gain spectrum induced at a desired position of said optical fiber in a longitudinal direction by modulating frequencies of the pumping light and probe light inputted oppositely from both ends of said optical fiber; and
   determining, as the temperature distribution of the predetermined measurement region of the object, the temperature distribution of said sensor portion disposed three-dimensionally along the longitudinal direction of said optical fiber.

3. An object temperature distribution measuring method according to claim 1, wherein a sampling interval and spatial resolution of the temperature distribution measurement along the longitudinal direction of said optical fiber, a range of the temperature distribution measurement, and an execution time of the temperature distribution measurement are set by adjusting a frequency-modulation pattern of the pumping light and probe light in accordance with a kind of a fluid as an object to be measured.

4. A sensor unit for applying physical quantity in a predetermined measurement region of an object to a BOCDA-type optical fiber sensor, comprising:
an optical fiber including a sensor portion that comes close to or comes in contact with the object, said sensor portion being disposed two-dimensionally or three-dimensionally with respect to the predetermined measurement region of the object; and
a fixing structure holding an arrangement state of said sensor portion so as to suppress fluctuation of relative position of each part of said sensor portion in said optical fiber.

5. An object temperature distribution measuring method according to claim 2, wherein a sampling interval and spatial resolution of the temperature distribution measurement along the longitudinal direction of said optical fiber, a range of the temperature distribution measurement, and an execution time of the temperature distribution measurement are set by a frequency-modulation pattern of the pumping light and probe light being adjusted according to a kind of a fluid as an object to be measured.

* * * * *